Feb. 28, 1967 C. W. COOK 3,306,315
LUBRICATED BALL VALVE CONSTRUCTION
Filed May 6, 1964 2 Sheets-Sheet 2
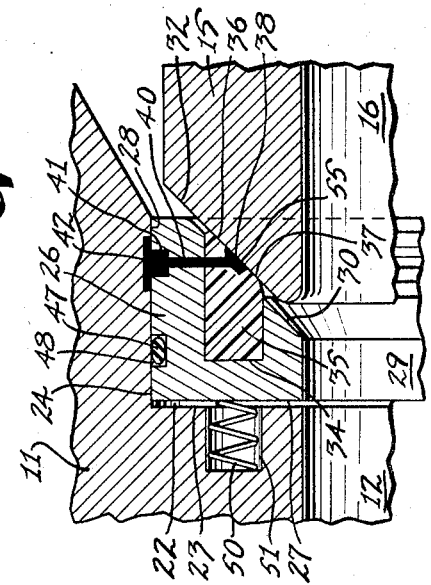
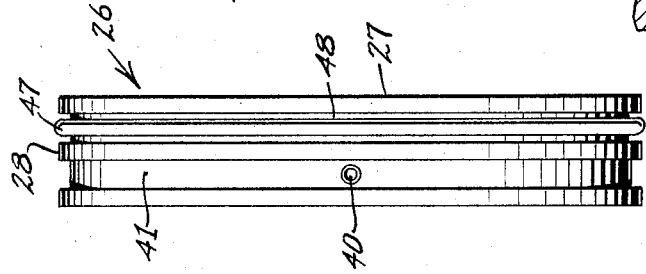
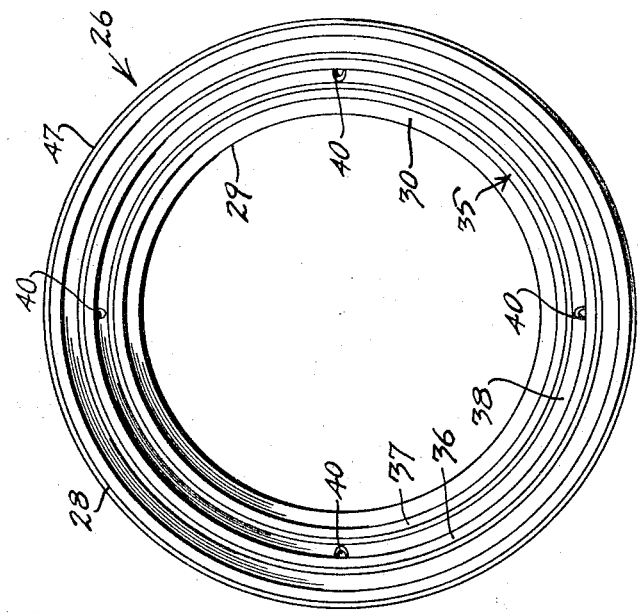
INVENTOR:
CLYDE W. COOK
BY
Harrington A. Lackey
ATTORNEY

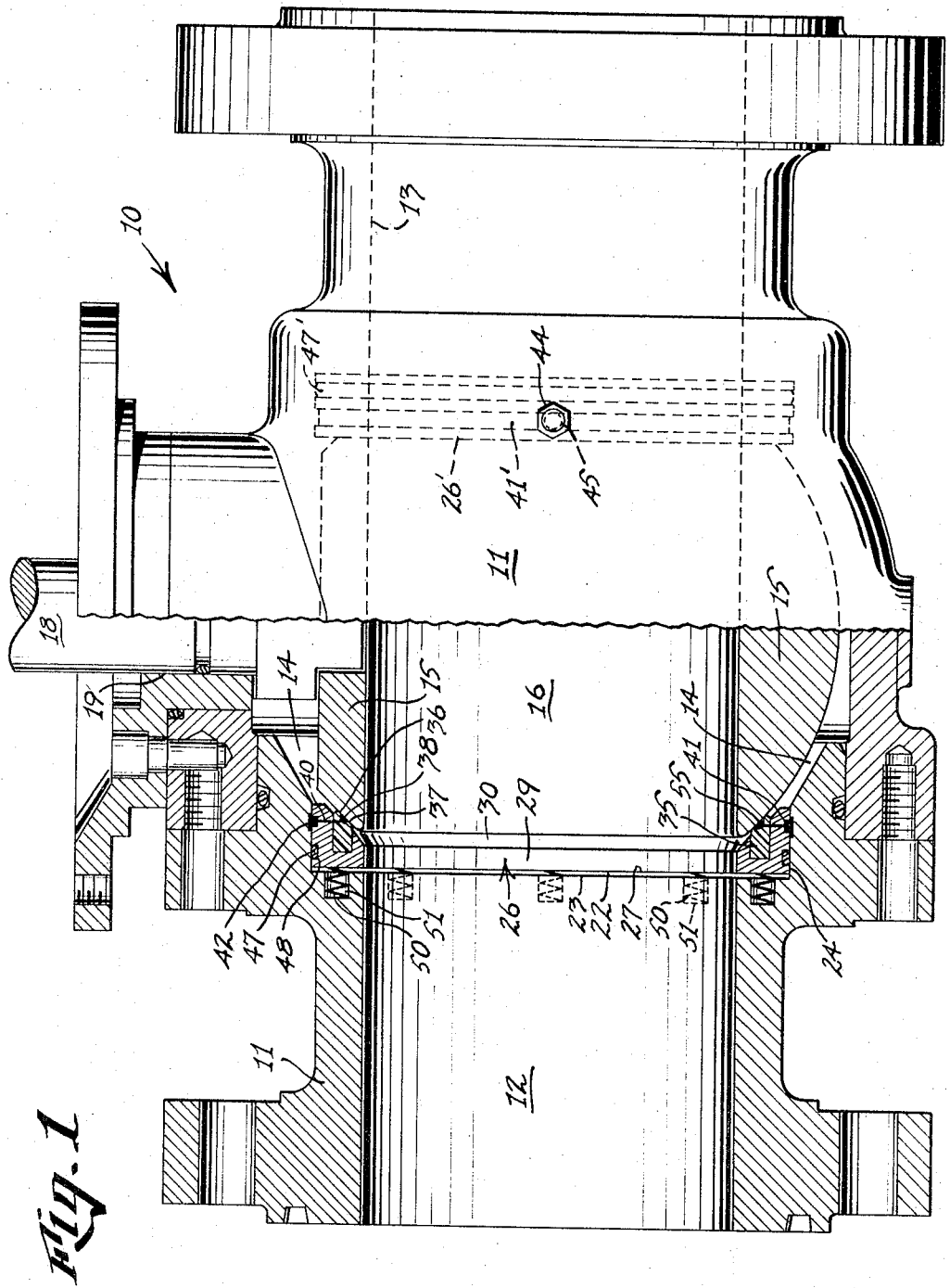

United States Patent Office 3,306,315
Patented Feb. 28, 1967

3,306,315
LUBRICATED BALL VALVE CONSTRUCTION
Clyde W. Cook, Erin, Tenn., assignor to Cook Valve Company, Inc., Erin, Tenn., a corporation of Tennessee
Filed May 6, 1964, Ser. No. 365,301
3 Claims. (Cl. 137—246.22)

This invention relates to a valve construction, and more particularly to a seat construction for a ball valve.

One object of this invention is to provide a seat construction for a ball valve in which the valve may be easily turned to facilitate opening and closing the passage through the valve body or casing. This seat construction is particularly desirable for the larger ball valves employed in pipelines, such as are used in the long distance transmission of oil and gas, and where such valves are rarely closed.

Another object of this invention is to provide a seat construction for a ball valve in which the valve may be easily turned on its seat, even after long periods of non-use, without breaking the fluid seal between the valve and its seat.

Another object of this invention is to provide a valve seat construction in which a constant seal and constant lubrication are maintained between the valve and the seat.

A further object of this invention is to provide a floating valve seat which is adapted to maintain the seal between the valve and the seat even against the excessive forces of fluid flow through the valve.

Another object of this invention is to provide a valve seat construction incorporating novel means for distributing a lubricant to a floating valve seat in various floating positions.

A further object of this invention is to provide a triple seal construction in a valve seat, including a fluid sealant between a pair of solid sealants, and in which the fluid sealant also lubricates the face of the valve.

Further objects and advantages of the invention will be apparent from the following description taken in conjunction with the drawings, wherein:

FIG. 1 is a side elevation of a typical ball valve construction incorporating the invention, shown partially in section;

FIG. 2 is an interior face view of the seat construction made in accordance with this invention;

FIG. 3 is an edge view of the seat construction disclosed in FIG. 2; and,

FIG. 4 is an enlarged fragmentary sectional elevation of a portion of the seat and valve construction disclosed in FIG. 1.

Referring now to the drawings in more detail, FIG. 1 discloses a typical ball valve construction such as a blow-down valve 10, having a valve body 11. The valve body 11 includes a pair of aligned cylindrical fluid passages 12 and 13 on opposite sides of a valve chamber 14. Within the valve chamber 14 is a ball valve 15, also having a cylindrical fluid passage, or opening, 16, of equal diameter and adapted to align coaxially with the fluid passages 12 and 13, when the valve 15 is open. The ball valve 15 is adapted to be rotated about an axis normal to the axis of the passages 12, 16 and 13, in order to open and close the valve, by means of a spindle 18 fixed to the ball valve 15 and mounted to freely rotate within an opening 19 in the valve body 11. The spindle 18 may be manually rotated by a handle, a hand wheel or wrench, not shown.

An annular recess 22 is formed in the body 11 at the end of the fluid passage 12 opposing the valve chamber 14. The recess 22 has a radial ledge 23 and a cylindrical wall 24, which is coaxial with the passage 12. Mounted in the recess 22 is an annular seat holder 26 having an end wall 27 opposing the ledge 23, a cylindrical outer wall 28 engaging the cylindrical recess wall 24, and a circular or cylindrical fluid opening 29 of the same diameter as and coaxial with the fluid passage 12. The operative face 30 of the seat holder 26 tapers from the opening 29 axially outwardly toward the cylindrical wall 28, so that the face flares at substantially the same angle as the end face 32 of the valve 15.

The seat holder 26 has an annular recess 34 opening through the face 30 and adapted to snugly receive the annular valve seat 35. The face of the valve seat 35 protrudes beyond the seat holder face 30 and forms a pair of spaced annular walls 36 and 37, having tapered surfaces adapted to simultaneously abut flush against the flared face 32 of the ball valve 15. An annular fluid cavity 38 is defined by the space between the seat walls 36 and 37.

A plurality of small holes 40 communicate with the annular cavity 38 and extend radially outwardly through the valve seat 35 and the seat holder 26 to terminate in an annular inlet groove 41. Opposing the inlet groove 41 is an axially longer groove 42 formed in wall 24 of the recess 22. This groove 42 is sufficiently long to provide continuance of fluid communication between the groove 42 and the inlet groove 41 regardless of the axial position of the seat holder 26 within the limits of its axial movement between the end face 32 of the ball valve 15 and the end wall 23 of the recess 22. As best disclosed in FIG. 1, a lubricating fluid is introduced into the annular groove 42 through a fitting 44 having a radial bore 45 extending through the body 11 into the annular groove 42. Although FIG. 1 discloses fitting 44 for introduction of fluid into the inlet 41' of the seat holder 26', which is at the right end of the ball valve 15, a similar fitting, not shown, is provided for the seat holder 26.

The seat holder 26 is secured in the recess 22 by means of an annular resilient gasket of O-ring 47 seated in an annular recess 48 in the outer wall 28 of the seat holder 26 in such a manner that the O-ring 47 engages firmly against the wall 24 of the recess 22. The O-ring 47 forms a complete fluid seal between seat holder 27 and the body 11, as well as providing sufficient frictional engagement to prevent rotational movement of the seat holder 26 in the recess 22. However, the O-ring 47 does permit limited axial movement of the seat holder 26 in the recess 22 without breaking the sealing engagement between the walls 24 and 28.

In order to maintain the seat 35 in constant engagement with the end face 32 of valve 15, a plurality of springs 50 are seated in spring wells 51, circumferentially spaced around the annular passage 12 and opening through the ledge 23. The springs 50 are compressed to engage the end wall 27 of seat holder 26 and force the seat walls 36 and 37 firmly and flush against the end face 32 of the ball valve 15. This floating mounting of the seat holder 26 upon the springs 50 forces the seats at each end of the valve chamber 14 to constantly engage the corresponding end faces 32 of the ball valve 15 to maintain a permanent fluid seal and continuous lubrication, regardless of the force or direction of the fluid moving through the passages 12, 16 and 13 and tending to axially move the ball valve 15.

A conventional lubricant, such as a heavy oil or grease 55 is introduced through the fittings 44 for both seat holders 26 and 26'. The lubricant 55 is transferred from the fitting 44 through the annular grooves 42 and 41 and through the plurality of holes 40 into the annular cavity 38. When the cavity 38 is filled, the lubricant 55 presses against the portion of the end face 32 of the ball valve 15 between the seat walls 36 and 37, not only to form a third seal in addition to the walls 36 and 37, but also to lubricate the face wall 32. The seat 35 is preferably made of a hard bearing material which has a very low coefficient of friction, such as the plastics nylon and Teflon, which are known for their hard durable bearing characteristics.

With the valve seat construction described above, the manipulation of even very large and heavy ball valves is greatly facilitated. Moreover, even when the valve 15 is manipulated occasionally or even rarely, the excellent sealing and lubricating qualities of the seat construction will reduce rust, corrosion and other defects in the bearing surfaces between the valve and the seat to maintain the operativeness and responsiveness of the valve over a long period of time.

It will be apparent to those skilled in the art that various changes may be made in the invention without departing from the spirit and scope thereof, and therefore the invention is not limited by that which is disclosed in the drawings and described in the specification, but only as indicated in the appended claims.

What is claimed is:

1. In a ball valve construction including a valve body having a cylindrical fluid passage and a ball valve opening and closing said fluid passage, valve seat means comprising:
    (a) an annular recess in said valve body coaxial with said fluid passage and opposing said valve,
    (b) an annular seat holder received in said annular recess, said seat holder having a circular opening therethrough in alignment with said passage,
    (c) said seat holder having a face opposing said valve,
    (d) an annular seat recess in said seat holder opening through said face,
    (e) an annular valve seat fixed within said seat recess,
    (f) said seat having a seat face with a low coefficient of friction projecting axially from said seat recess beyond the face of said seat holder to slidably engage said valve,
    (g) an annular cavity having opposed annular walls in said seat face,
    (h) radial alignment holes extending through said seat and seat holder connecting said cavity with said recess in said valve body for conveying fluid lubricant to said cavity, and
    (i) means for introducing a fluid lubricant through said valve body into said aligned holes.

2. The invention according to claim 1 further comprising an annular inlet groove in said seat holder communicating with said aligned holes, opposing said annular recess and having an axial dimension, a feed groove in the annular recess of said valve body opposing and in fluid communication with said inlet groove, said feed groove having an axial dimension greater than the axial dimension of said inlet groove to maintain fluid communication between said feed groove and said inlet groove during the relative axial movement of said seat holder and said valve body.

3. The invention according to claim 1 in which said valve seat is made of a material having the bearing and frictional characteristics of nylon.

References Cited by the Examiner
UNITED STATES PATENTS

| | | | |
|---|---|---|---|
| 2,747,600 | 5/1956 | Laurent | 137—246.22 |
| 2,777,664 | 1/1957 | Bryant | 251—174 |
| 2,890,017 | 6/1959 | Shafer | 137—246.22 X |
| 3,068,887 | 12/1962 | Grove | 251—174 X |
| 3,100,499 | 8/1963 | Bass | 137—246.22 |
| 3,123,078 | 3/1964 | Brooks | 137—246.22 |
| 3,135,285 | 6/1964 | Volpin | 137—246.12 |
| 3,214,135 | 10/1965 | Hartmann | 137—246.22 X |

CLARENCE R. GORDON, *Primary Examiner.*